United States Patent [19]

Delepine

[11] Patent Number: 4,885,819

[45] Date of Patent: Dec. 12, 1989

[54] MEMBER FOR CONTROLLING A TAP OR A FAUCET

[76] Inventor: Jean C. Delepine, 23 rue Clapeyron, 75008 Paris, France

[21] Appl. No.: 214,886

[22] Filed: Jun. 30, 1988

Related U.S. Application Data

[63] Continuation of Ser. No. 27,108, Mar. 13, 1987, abandoned, which is a continuation of Ser. No. 746,299, Jun. 19, 1985, abandoned.

[30] Foreign Application Priority Data

Oct. 15, 1984 [FR] France .................. 84 15774
Jan. 3, 1985 [FR] France .................. 85 00042

[51] Int. Cl.4 ............................................. A47B 95/02
[52] U.S. Cl. .............................. 16/121; 74/553; 403/362; 403/373; 16/DIG. 30
[58] Field of Search ............ 16/110 R, 117, 118, 16/121, DIG. 18, DIG. 24, DIG. 30, DIG. 40; 403/16, 17, 361, 362, 373; 74/553, 558.5; 251/293; D8/310; D23/250

[56] References Cited

U.S. PATENT DOCUMENTS

| | | |
|---|---|---|
| D. 93,009 | 8/1934 | Francis ................ D23/28 |
| D. 169,551 | 5/1953 | Kendrick . |
| D. 187,848 | 5/1960 | Hulyk . |
| D. 205,028 | 6/1966 | Greenberg . |
| D. 207,940 | 6/1967 | Laguera . |
| D. 226,561 | 3/1973 | Jones et al. . |
| D. 271,514 | 11/1983 | Paul . |
| D. 273,512 | 4/1984 | Arnolds . |
| D. 278,270 | 4/1985 | Niemann . |
| D. 278,271 | 4/1985 | Niemann . |
| D. 279,596 | 7/1985 | Rademacher ............ D23/28 |
| D. 279,597 | 7/1985 | Rademacher ............ D23/28 |
| D. 279,598 | 7/1985 | Rademacher . |
| D. 280,437 | 9/1985 | Rademacher . |
| D. 284,992 | 8/1986 | Joerger . |
| D. 287,161 | 12/1986 | Piesco . |
| D. 287,163 | 12/1986 | Piesco . |
| 751,533 | 2/1904 | Metcalf ................ 16/121 |
| 1,582,502 | 4/1926 | Bartlett ............ 16/DIG. 30 |
| 2,111,965 | 3/1938 | Crutchfield ............ 16/121 |
| 2,316,918 | 4/1943 | Wallace ............... 16/121 |
| 3,082,643 | 3/1963 | Grassi et al. ........... 16/121 |
| 3,487,496 | 1/1970 | Guyton et al. .......... 16/121 |
| 3,758,920 | 9/1973 | Dobrjanskyj et al. ...... 16/121 |
| 4,065,216 | 12/1977 | Nelson ................ 16/121 |

FOREIGN PATENT DOCUMENTS 609231 2/1935 Fed. Rep. of Germany ........ 16/121

Primary Examiner—Frank T. Yost
Assistant Examiner—Eugenia A. Jones
Attorney, Agent, or Firm—Fisher, Christen & Sabol

[57] ABSTRACT

The present invention relates to a member for controlling a tap or faucet, wherein it comprises a cylindrical skirt of circular or polygonal section and at least one added piece adapted to be fitted on the cylindrical skirt and to be fixed thereon at any desired height. The invention results in a top control member of which the grip and/or decorative appearance may be modified as desired.

20 Claims, 4 Drawing Sheets

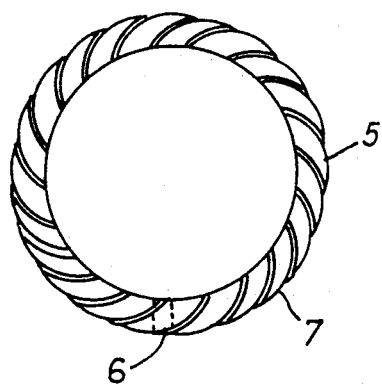
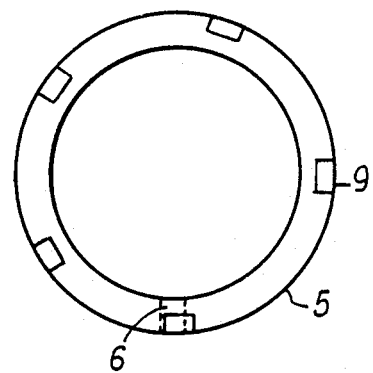
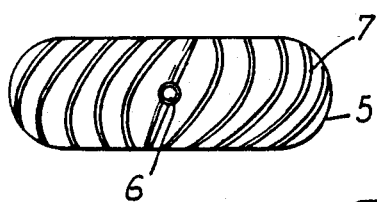
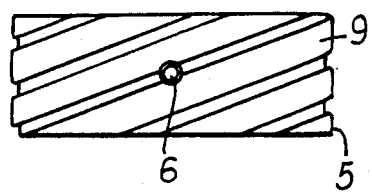
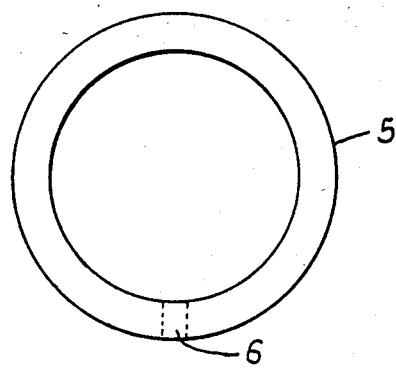

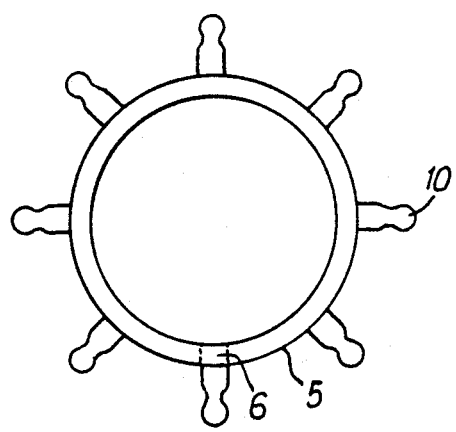
Fig: 6A
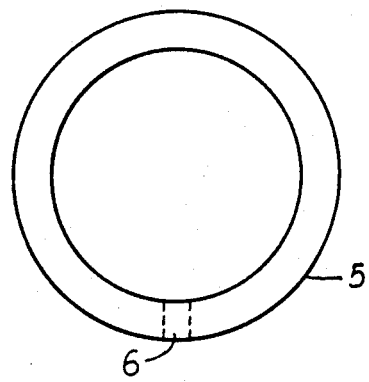
Fig: 7A
Fig: 6
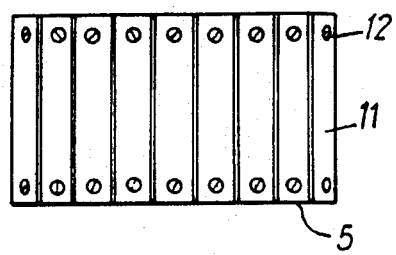
Fig: 7
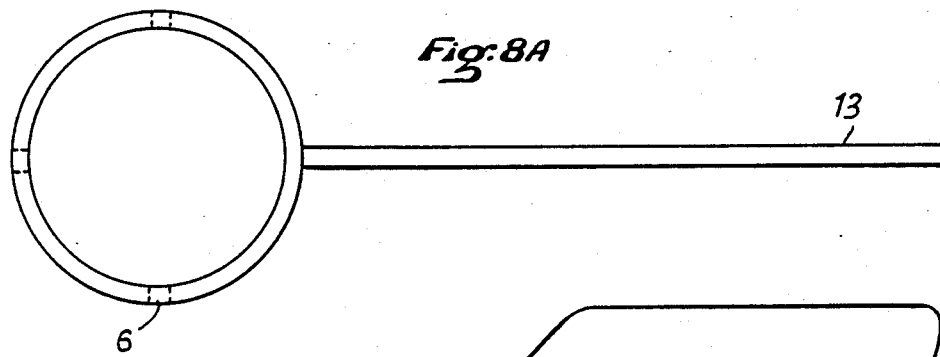
Fig: 8A
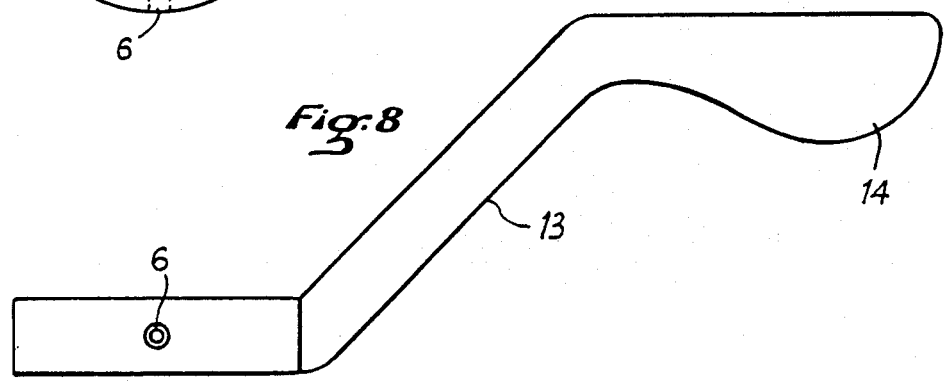
Fig: 8

MEMBER FOR CONTROLLING A TAP OR A FAUCET

This application is a continuation of application Ser. No. 027,108, filed Mar. 13, 1987 now abandoned, which is a continuation of application Ser. No. 746,299 filed 6/19/85, now abandoned.

The present invention relates to a member for controlling a cock, and in particular a tap or faucet in a sanitary installation.

The tap controlling members are generally constituted by handles, knobs or the like, fixed on the stem of the tap controlling seal thereof. Such control members are made in one piece and they cannot be easily adapted to particular cases of use, of decoration, etc . . . unless they are designed especially.

It is an object of the present invention to overcome these drawbacks and it relates to a member for controlling a tap or faucet which may easily be adapted to each particular case of grip and/or of decoration.

To this end, according to the invention, the member for controlling a tap or faucet is characterized in that it comprises a cylindrical skirt of circular or polygonal section and at least one added piece adapted to be fitted on said skirt and to be fixed thereon at any desired height.

Thus, by appropriately selecting the shape of each added piece, the number of added pieces and the arrangement thereof on said skirt, the tap may be easily adapted for each user (for example a handicapped person) and a plurality of different decorative effects may be obtained.

In fact, in addition to their various shapes, said added pieces may either be contiguous or spaced apart over said skirt and the decorative effects as well as the grips that they form may be multiple.

In a simple embodiment, each added piece may be constituted by a ring.

In order to increase the aesthetic effect further, the skirt and the added pieces may be made of materials of different appearance.

In addition, the materials of each of the pieces may also be different.

The invention will be more readily understood on reading the following description with reference to the accompanying drawings, in which.

The pairs of FIGS. 3, 3A; 4, 4A; 5, 5A; 6, 6A; 7, 7A; 8, 8A and 9, 9A are, respectively, a view in elevation and a plan view of variant embodiments of said added piece.

Figure 10:
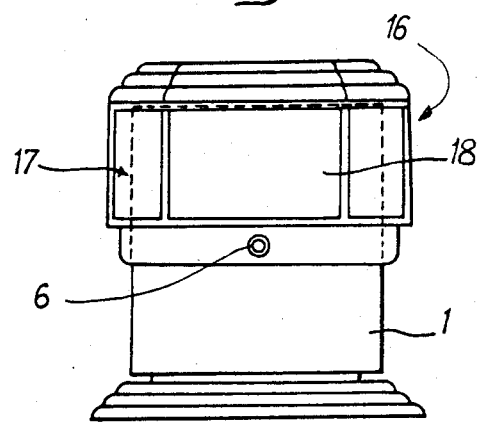

FIG. 10 shows in elevation a variant embodiment of the tap controlling member according to the invention.

Figure 1:
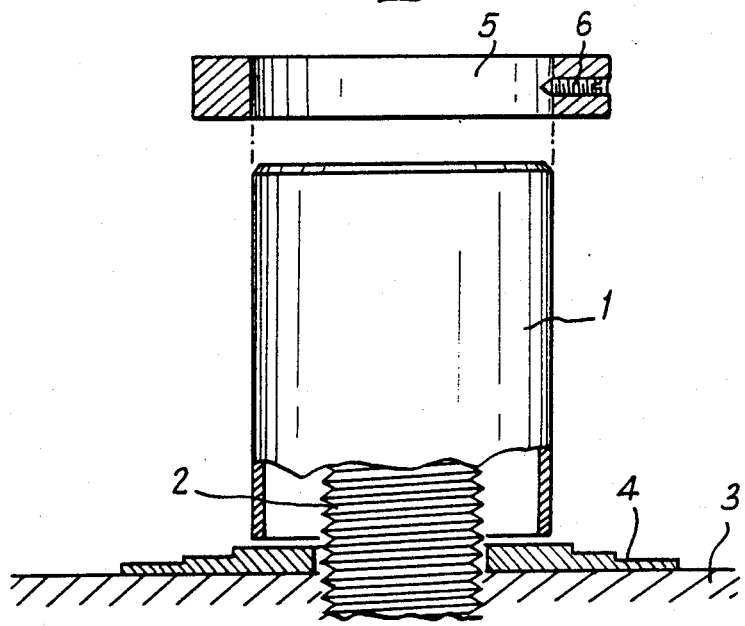
FIG. 1 is an exploded view in elevation illustrating a tap controlling member according to the invention, partly in section.

Referring now to the invention, the tap controlling member according to the invention and shown in FIG. 1, comprises a skirt 1 of substantially cylindrical form, of circular or polygonal section.

As shown in FIG. 1, the body of the tap comprises a threaded part 2 passing through the wall 3 on which the tap is fixed. On the threaded part 2 is screwed a washer 4 applied against the wall 3. When the tap is in closed position, the lower part of the skirt 1 lies near the washer 4.

Furthermore, the control member according to the invention comprises at least one added piece 5 which, in FIG. 1, is in the form of a square-sectioned torus. The inner recess of the torus 5 is provided for the latter to be able to slide on the skirt 1. Moreover, the torus 5 is provided with a locking screw 6 enabling the torus 5 to be fixed in any desired position along the skirt 1.

The material and/or appearance of the torus 5 is preferably different from that of the skirt 1. For example, skirt 1 is nickel-plated, whilst torus 5 is gold-plated.

It will be readily imagined that the appearance and/or grip of the tap control member according to the invention may be varied in multiple ways. For example:

a plurality of added pieces 5 of different shapes and/or appearance may be provided;

a variable number of added pieces 5 may be mounted on skirt 1;

the pieces 5 may be mounted differently on the skirt 1, for example contiguously or in spaced apart relationship.

Figure 2:
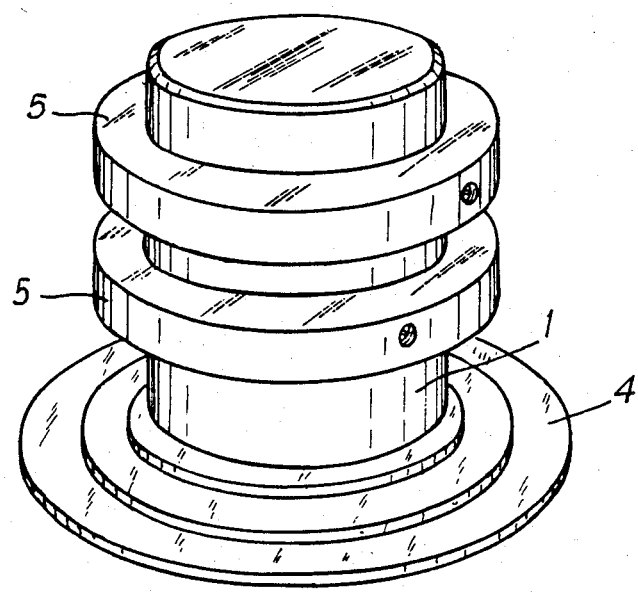
FIG. 2 is a view in perspective of an embodiment of the tap control member according to the invention.

FIG. 2 shows a particularly simple (and non-limiting) embodiment of the tap control member according to the invention.

In this particular embodiment, the gripping means of the tap control member are constituted by two toruses 5, spaced apart from each other.

Variant embodiments of the added piece 5 are illustrated in FIGS. 3, 3A to 9, 9A.

In FIGS. 3 and 3A, the added piece 5 carries twists 7 covering it over all its outer surfaces. The spacing of the twists 7 may be varied as desired.

In FIGS. 4 and 4A, the added piece 5 presents on the outer lateral face spaced apart annular bands 8. The width of these bands, as well as the nature of the material employed, are variable. FIGS. 5 and 5A present a toroidal added piece 5 which, on at least part of its outer face, presents helicoidal bands 9 giving the surface of said added piece a generally spirally wound appearance.

FIGS. 6 and 6A present spaced apart, outwardly projecting elements 10. In a particular embodiment, the elements 10 are constituted by small handles giving the whole of the added piece 5 the appearance of a ship's wheel. In FIGS. 7 and 7A, the surface irregularities result from the fixation of juxtaposed rectangular plates 11 parallel to the axis of the piece 5. Each plate 11 may be fixed by means of screws 12, for example one at each end. In FIGS. 8 and 8A, the ease of grip of the added piece 5 is increased by the addition of a handle 13. This handle may be of varied shapes and sizes, the gripping end 14 being for example at right angles to the main axis of the added piece 5.

Figure 9A:
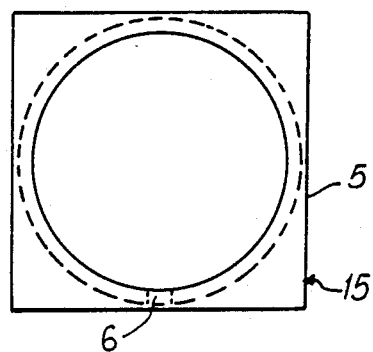
Figure 9:
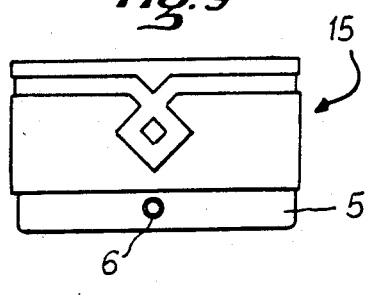

In FIGS. 9 and 9A, the added piece 5 presents a square-sectioned outer contour 15. The outer faces may be covered with embossed designs to improve the aesthetics of the piece and the ease of grip.

FIG. 10 shows a particular embodiment of the invention consisting in using an added piece 5 of which the outer contour presents an octagonal section 16. In a particular embodiment, the added piece 5 presents faces of different sizes, two types of faces composing the whole, namely small faces 17 and large faces 18. The two types of faces 17, 18 are provided at their ends with decorative elements.

It is a general object of the present invention to create gripping means which considerably increase the grip of the added pieces 5. Moreover, these means which result from surface irregularities give the piece an ornamental appearance. As mentioned above, the material used for the added piece 5 is not limited to the material employed for the skirt 1. Different materials may be used for the added part 5, thus increasing the decorative appearance of the whole.

What is claimed is:

1. A handle apparatus for a tap comprising:
   a cylindrical skirt;
   at least one annular piece able to freely slide along said cylindrical skirt, wherein said annular piece is shorter than said cylindrical skirt, whereby when said annular piece is in a median position on said skirt the cylindrical skirt is visible above and below said annular piece; and
   fixation means supported by said annular piece for fixing said annular piece at any position along said cylindrical skirt, wherein the height of said handle remains constant when said annular piece is moved relative to said cylindrical skirt.

2. The apparatus of claim 1, wherein said cylindrical skirt has a circular cross section and the inner surface of said piece is circular and concentric with said cylindrical skirt.

3. The apparatus as claimed in claim 2, wherein said piece includes at least one handle extending radially outward from said piece.

4. The apparatus of claim 1, wherein said cylindrical skirt has a polyganol cross section and the inner surface of said piece is polyganol.

5. The apparatus as claimed in claim 2, wherein said piece includes a handle extending radially outward from said cylindrical skirt.

6. The apparatus as claimed in claim 2, wherein said piece includes a plurality of spaced apart annular bands.

7. The apparatus as claimed in claim 1, wherein said piece has an outer surface comprising juxtaposed rectangular plates fixed to said piece.

8. The apparatus as claimed in claim 1, wherein said piece includes a square sectioned outer contour.

9. The apparatus as claimed in claim 8, wherein said piece includes an outer embossed surface.

10. The apparatus as claimed in claim 1, wherein said piece includes an octogonal sectional outer contour.

11. The handle of claim 1, wherein said cylindrical skirt has a polyganol cross section and said inner surface means is polyganol.

12. The apparatus of claim 13, wherein said piece includes an octogonal sectioned outer contour.

13. A handle for a tap comprising:
    a cylindrical skirt fixedly attached to said tap having longitudinally opposed ends and an outer surface;
    at least one freely movable piece having an inner surface means cooperating with said outer surface of said cylindrical skirt for permitting longitudinal sliding contact between said ends, wherein said piece is shorter than said skirt, whereby when said piece is in a median position on said skirt the skirt is visible above and below said piece; and
    fixing means for fixing said movable piece at a desired position along said cylindrical skirt, wherein the height of the handle remains constant when said freely movable piece is moved relative to said cylindrical skirt.

14. The handle of claim 13, wherein said cylindrical skirt has a circular cross section and said inner surface means is circular and concentric with said cylindrical skirt.

15. The handle of claim 13, wherein said piece includes a handle extending radially outward from said cylindrical skirt.

16. The handle as claimed in claim 13, wherein said piece includes a plurality of spaced apart annular bands.

17. The handle as claimed in claim 13, wherein said piece has an outer surface comprising juxtaposed rectangular plates fixed to said piece.

18. The handle of claim 13, wherein said piece includes a square sectioned outer contour.

19. The apparatus of claim 18, wherein said piece has an outer embossed surface.

20. A decorative handle assembly for a tap, comprising:
    a cylindrical skirt fixedly attached to said tap having longitudinally opposed ends and an outer surface;
    a plurality of freely movable pieces each having an inner surface means cooperating with said outer surface of said cylindrical skirt for permitting longitudinal sliding contact between said ends; and
    fixing means for fixing each said piece to said cylindrical skirt at a desired position along said cylindrical skirt.

* * * * *